United States Patent [19]

Jones

[11] Patent Number: 4,852,947

[45] Date of Patent: Aug. 1, 1989

[54] OPERATING HEAD WITH PHASED FLUID DELIVERY

[75] Inventor: Philip Jones, Bromsgrove, England

[73] Assignee: Pitcraft Summit Limited, Hoyland Nether, Nr. Barnsley, United Kingdom

[21] Appl. No.: 123,140

[22] Filed: Nov. 20, 1987

[51] Int. Cl.<sup>4</sup> ............................................. E21C 35/22
[52] U.S. Cl. ....................................... 299/81; 299/17
[58] Field of Search ......................... 299/1, 16, 17, 81; 239/99, 101

[56] References Cited

U.S. PATENT DOCUMENTS

| | | | |
|---|---|---|---|
| 4,049,318 | 9/1977 | Fruin | 299/81 |
| 4,162,763 | 7/1979 | Higgins | 239/101 |
| 4,368,918 | 1/1983 | Dröscher et al. | 299/1 |
| 4,368,925 | 1/1983 | Honke | 299/81 X |
| 4,621,869 | 11/1986 | Parrott | 299/81 |
| 4,660,891 | 4/1987 | Krämer-Wasserka | 299/81 |
| 4,660,892 | 4/1987 | Demoulin | 299/81 |
| 4,691,967 | 9/1987 | Schupphaus | 299/81 X |
| 4,721,341 | 1/1988 | Maschewski | 299/81 |
| 4,755,002 | 7/1988 | Parrott | 299/81 |

FOREIGN PATENT DOCUMENTS

| | | | |
|---|---|---|---|
| 235319 | 9/1987 | European Pat. Off. | 299/81 |
| 8129772 | 12/1980 | United Kingdom . | |
| 8227517 | 10/1981 | United Kingdom . | |
| 8427792 | 11/1984 | United Kingdom . | |
| 8428353 | 11/1984 | United Kingdom . | |
| 8506818 | 3/1985 | United Kingdom . | |
| 2189531 | 10/1987 | United Kingdom | 299/81 |
| 2190942 | 12/1987 | United Kingdom | 299/81 |

Primary Examiner—Jerome W. Massie, IV
Assistant Examiner—Matthew Smith
Attorney, Agent, or Firm—R. A. Giangiorgi

[57] ABSTRACT

Operating head assembly, e.g. cutter head of a coal or other mining machine having provision for feeding a supply of water or other fluid to the head during operation has provision for phasing the fluid delivery to limit it to the zone about the head in which the cutting action is taking place dependent on the direction of movement of the head. Delivery jets of the head are fed through individual valve units (22) each having an independently operable hydraulic or other actuator (28), the power input thereto being controlled by apertured timing faces (36, 38) on co-acting parts of the head (11) and body (10), power feed through the timing faces being controlled e.g. in correspondence to the position of change-over valve (44, 46) operating in response to controls which direct movement of the head. In an alternative construction the valve units are actuated mechanically by a camming formation which can be indexed depending on the direction of movement.

22 Claims, 3 Drawing Sheets

OPERATING HEAD WITH PHASED FLUID DELIVERY

This invention relates to operating head assemblies of machines of the kind in which a rotatable or angularly displaceable head is journalled in or on a body of the assembly for operative movement about a first axis and the assembly itself is selectively operatively shifted rectilinearly and/or curvilinearly about one or more second axes to carry the head along a chosen operating path, said assembly including provision for feeding a supply of fluid to the head during said movement and shifting.

Said fluid feed may itself be the acting medium of the process effected by operation of the head on a workpiece or other body, for example in a washing, spraying or like process; or it may be ancilliary thereto as in the supply of a cutting lubricant, cooling, or other process fluid to a cutter head mounting one or more tool bits acting on the workpiece or other body as in a mining machine such as a road header or coal shearer acting on a rock face, or in a machine tool.

For example, in a mining machine as referred to above, it is known to provide high pressure water feed through or in relation to the cutter head assembly whereby high pressure jets are directed onto or immediately in advance of the envelope of revolution of the acting parts of the tool bits. In many known machines the operation of these jets is not phased, instead they act indiscriminately around the whole head even though actual cutting action will take place only in a zone of said envelope of revolution depending on the direction in which the head assembly is being shifted and the path it is following. Attempts to provide automatic or semi-automatic phasing have not hitherto proved reliable and effective for practical use particularly for heavy duty machines operating under adverse conditions as in coal cutting and other mining machines.

The object of the invention is to provide an operating head assembly having a fluid distribution system phased to the action of the head, which is particularly efficient, reliable and economical in operation, and which is of compact dimensions facilitating fitment as an adaptation onto existing machines.

According to the invention an operating head assembly includes a fluid distribution system having fluid input duct means connecting the body with the head for continuous feed of the fluid thereto as the head rotates or is otherwise displaced relative to the body in use, a plurality of delivery jets at respective positions on the head, manifold means including ducts in or on the head for passing said feed to said jets, a plurality of valve units carried in or on the head each having power operated actuating means to open or close the duct or ducts leading to a jet or jets in a respective angular zone of the head, timing means including drive input means of the body of the assembly operable for selective transmission of power to the actuating means of the valve units individually by way of coacting formations of the body as the head rotates or is so displaced, said timing means being controllable so that the jets are only operated as they pass sequentially through a preselected angular zone about the head assembly in which the cutting action is taking place in use.

Preferably the control of the timing means is automatic, the angular zone in which the jets are brought into operation being determined by the direction in which the head assembly is being shifted during cutting. However, it is contemplated that semi-automatic or manual or other non-automatic selection might be provided.

Embodiments of the invention are now more particularly described with reference to the accompanying drawings wherein.

Figure 1:
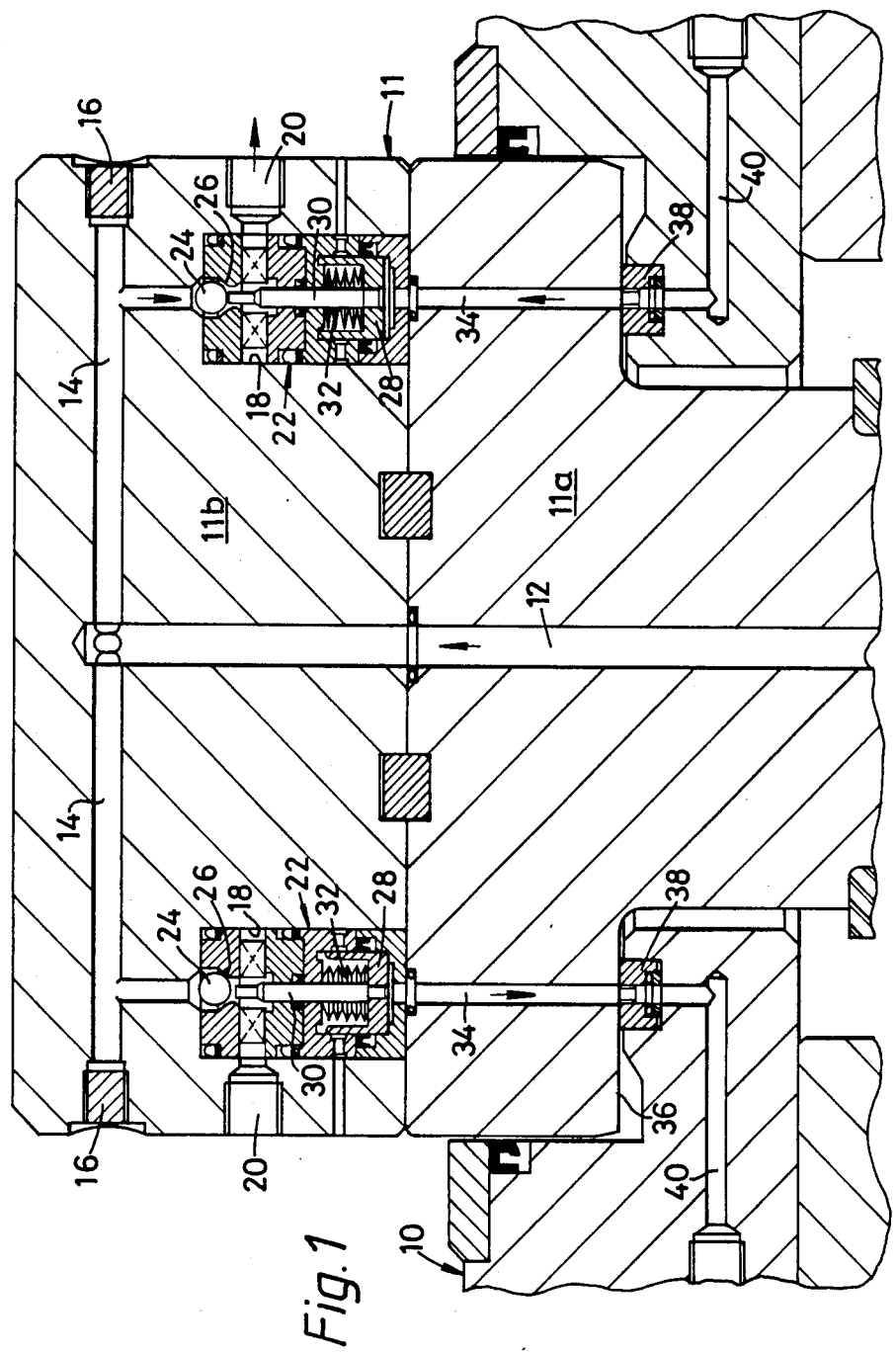
FIG. 1 is a section in a diametral plane of part of a cutter head assembly incorporating a first embodiment of the invention.
Figure 2:
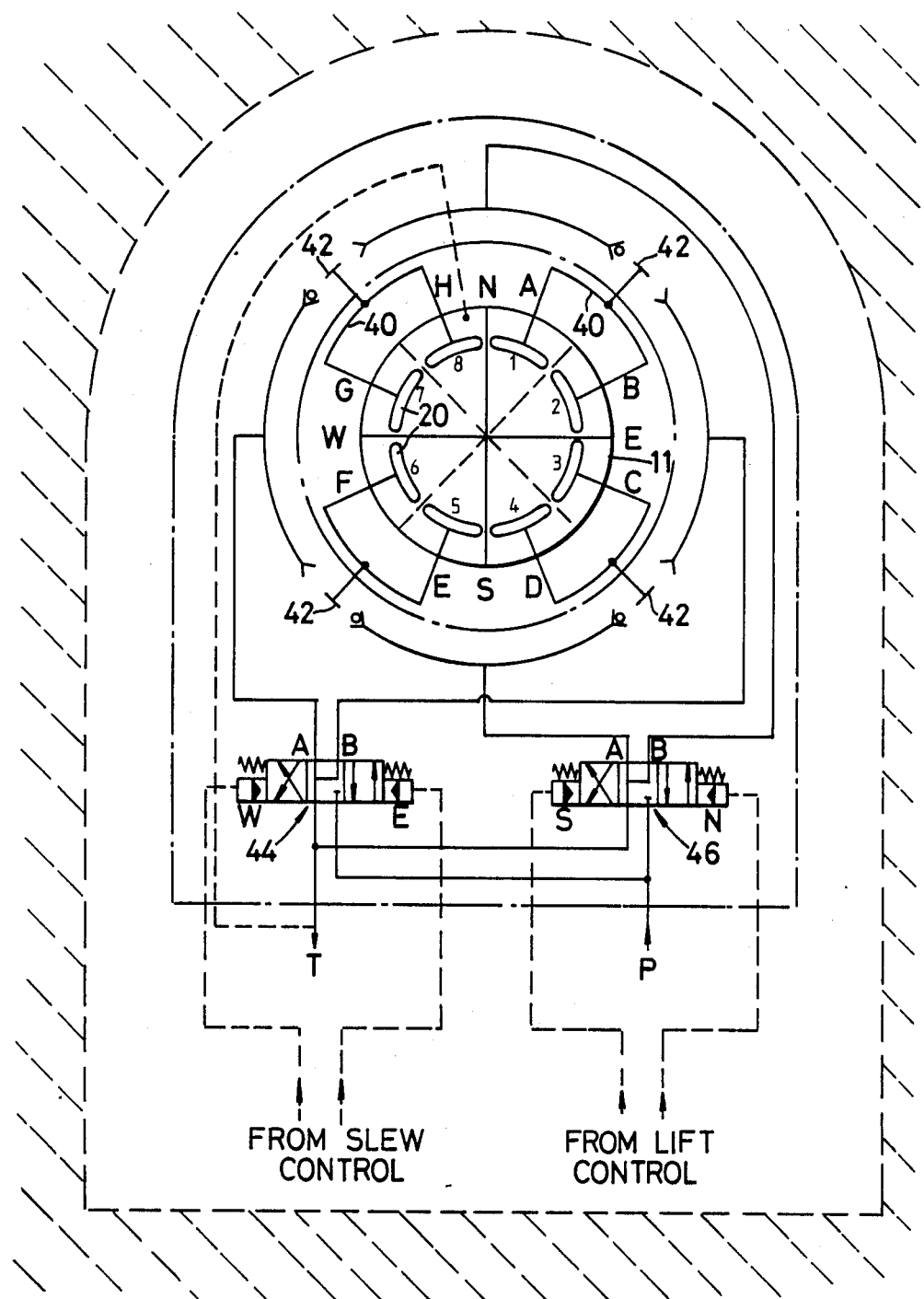
FIG. 2 is a diagram of the hydraulic power circuit of timing means of said assembly.

In the embodiment shown in FIGS. 1 and 2 a rotary cutter head as for a mining road header has a head assembly comprising a non-rotating body 10 (part only shown) in which is journalled a power driven cutter head 11 for rotation relative to body 10. Head 11 includes a shank portion 11a and a distal axially outer portion 11b fixed thereto. The head carries picks or other cutter bits on a cylindrical drum in conventional manner (not shown for simplicity). Other than as referred to herein the construction and operation of the cutter head is conventional and well known and is not therefore further described in detail.

A high pressure water main input duct 12 extends coaxially into distal portion 11b to connect with a plurality of radially extending water distribution ducts 14. In a conventionally constructed head assembly, ducts 14 would connect directly with respective delivery jets spaced equiangularly around the periphery of body 11 so that water would issue from all the jets indiscriminately during operation.

In the present construction the apertures which would normally receive such jets are closed by plugs 16 and each duct 14 connects with a respective valve chamber 18 formed within distal portion 11b and each communicating with a respective delivery jet 20 spaced axially from the associated plug 16. Each chamber 18 locates a respective valve unit 22 each comprising a one-way ball valve 24 coacting with a seating 26, said valve normally being held closed by the water pressure from input duct 12 so that the associated jet 20 is not operating.

Operation

Each unit 22 further includes a hydraulically powered plunger type actuator 28 carrying a pushrod 30. When actuator 28 is displaced by hydraulic pressure to overcome the force of a return spring 32 pushrod 30 lifts ball valve 24 from seat 26 as shown in the righthand unit in FIG. 1 allowing the pressurised water to pass to the associated jet 20.

Hydraulic power reaches each unit 22 for its selective operation by way of individual axially extending power ducts 34 passing through the radially outer part of shank portion 11a at spaced angular positions therearound and at uniform radius from the axis of rotation of the head. Ducts 34 open in a common radial face 36 of head 11 which coacts with mating seal formations 38 carried on body 10 and each connecting with respective hydraulic feed ducts 40 in said body.

The seal formations 38 define timing ports through which hydraulic power can be passed to the valve units 22 in sequence as head 11 rotates.

The number and location of units 22 and/or jets 20 may be varied according to the type of cutter head and the manner in which its tool bits are mounted. In the present example there are eight units 22 each associated with a single delivery jet 20 at equiangular positions around the head but it is to be understood that a single valve unit may control high pressure water feed to two or more jets acting in unison and/or a greater or lesser number of units may be incorporated and they need not necessarily be at equiangular positions.

FIG. 2 shows hydraulic power circuitry of the assembly diagramatically, the rotating cutter head 11 being represented as a disc carrying the eight jets 20 numbered 1-8 with power infeed through the eight body hydraulic feed ducts 40 lettered A-H. The application of hydraulic power through selected ones of ducts 40 to bring the jets into operation in the desired angular zone could be effected in a number of ways, for example valves in each duct could be set manually individually or in groups.

In the particular arrangement shown by way of example, adjacent pairs of ducts 40 A and B etc are connected in common to four automatic pressure responsive flow directing valves 42 interconnected in a ring or square formation with intermediate connections N,S,W and E connected to a pair of servo operated throttle changeover valves 44 and 46 which operate automatically in conjunction with hydraulic controls for setting the direction of cutting movement of the head assembly in known manner.

Assuming that the assembly is being shifted from West to East in the diagram, the cutting action of the bits will take place substantially in an angular zone in the easterly semi-circle and valves 44 and 46 are set so that hydraulic pressure is admitted at E displacing the two adjacent diverter valves 42 to close off any onward flow to N and S and apply hydraulic pressure through ducts 40A, B, C and D thus bringing four of jets 20 into operation sequentially while they are in that eastern zone. Thus the pressurised water is only applied in the region where cutting is actually taking place, there is little or no wastage of high pressure water and power requirements for its pumping and feed and wear and tear on the feed water pump and other equipment is substantially reduced giving increased efficiency and/or reduction in the capacity of pump required.

In this example of the mode of operation, the phasing is such that the other semi-circle in the North-west to South-west quadrants do not receive any pressure fluid though the associated ducting will be open to allow exhaust hydraulic fluid to return to its source through valves 44 and 46 so that the actuators 28 of the associated valve units are held inactive by their return springs and the associated ball valves 24 are closed in respect of the jets passing through those zones.

If the direction of shifting the cutter head assembly is changed, e.g., reversed for movement from East to West, shuttle valves 44 and 46 will changeover automatically to apply hydraulic pressure at W with exhaust from E so that the jets will be activated in the Westerly zone, again where cutting is taking place. Thus the pressurised water is only applied in phase with the cutting action.

For cutter or other operating head assemblies fed with phased low pressure water or other fluid supply, the ball valves 24 may not remain closed reliably under fluid pressure alone and valve return springs may be incorporated.

In an alternative construction the ball or other valves may be held closed by the hydraulic pressure from the power ducts and may be allowed to open for delivery of the water or other acting fluid to the zone of the head when hydraulic power from the units is allowed to exhaust.

While the above embodiment uses valve chambers 18 formed as bores extending in an axial direction of the head 11 with the components of the valve units 22 being located and aligned by said bores, in a modified form each valve chamber is defined in a cylindrical insert carrying the valve unit, so forming a valve module which can be inserted or removed as an entire subassembly in a locating bore of the head. Thus, for example, modules of standard dimensions can be interchanged for repair or replacement, or valve units of different types as referred to above can readily be fitted according to requirements. To facilitate removal and fitting of the valve units the locating bores may be arranged to open radially to the peripheral face of the head 11 instead of in an axial direction.

Figure 4:
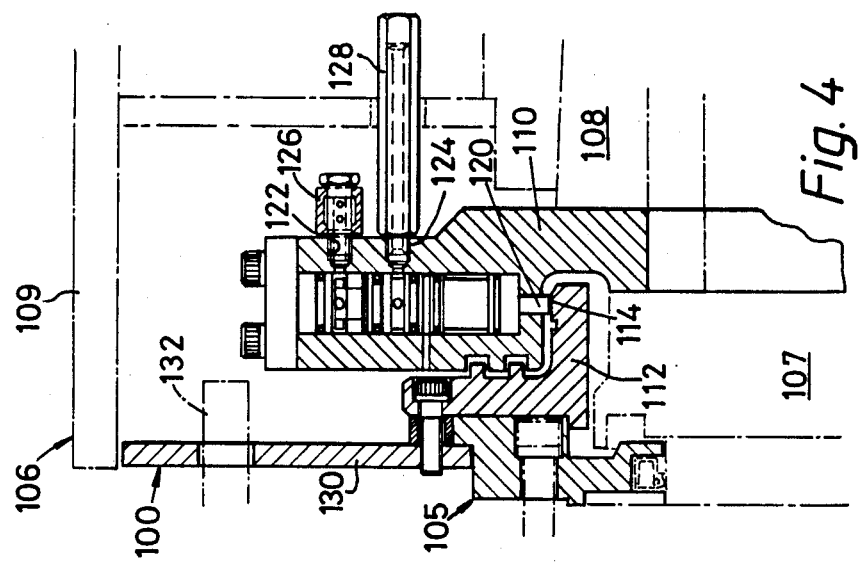
FIG. 4 is a section on line 4—4 of FIG. 3.
Figure 3:
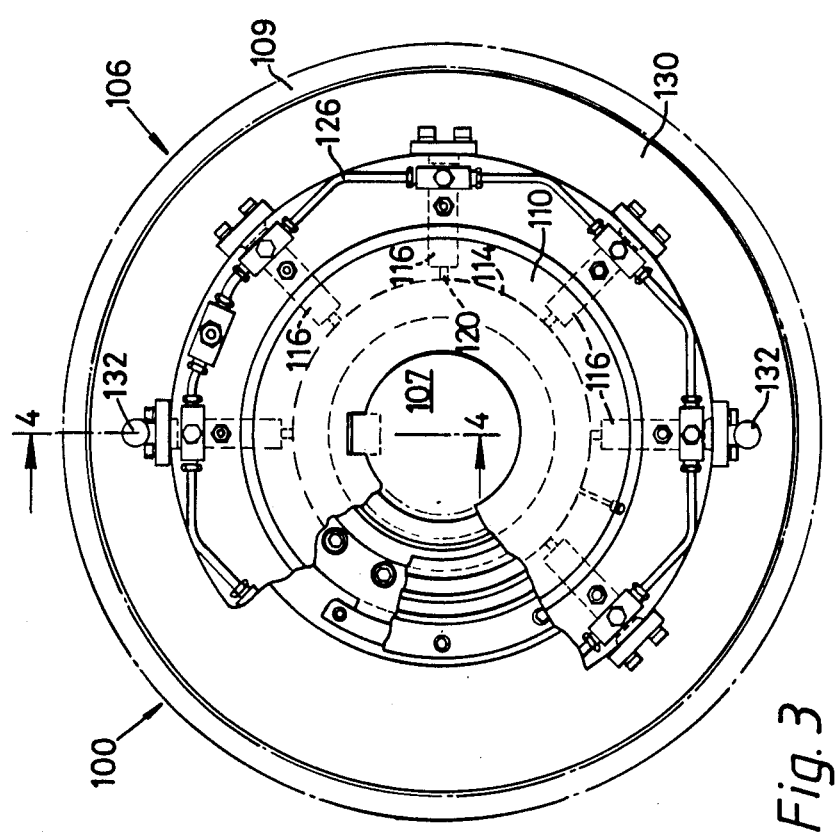
FIG. 3 is an end view partly in section of a like cutter head assembly incorporating a second embodiment of the invention.

Referring now to FIGS. 3 and 4 a cutter head assembly 100 of the same general type as previously described is provided with an embodiment of the invention having phased mechanical operation of valve units with semi-automatic control of its timing means.

Assembly 100 comprises a non-rotating body 104 (part only shown) in which is journalled a power driven rotating cutter head 106 including a main shaft 107 onto which is keyed a hub 108 carrying a drum-shaped cutter barrel 109 on which are mounted picks or other cutter bits (not shown).

An annular valve carrier plate 110 is located within barrel 109 mounted for rotation with shaft 107. The radially outer part of plate 110 is increased in axial thickness so that it overhangs in co-axial spaced relationship to an axially inner part of shaft 107.

A camming ring 112 is located co-axially of the shaft 107 and carrier plate 110 on a circular seating of the body 105. Ring 112 includes a radially inner axially extending flange portion which projects into the gap between the outer part of plate 110 and shaft 107, this flange including a profiled cam track 114 directed radially outwards.

A plurality, in this example eight, valve modules 116 are removably located in radial bores in carrier plate 110 at equi-angular positions.

Each module 116 includes a valve unit 118 comprising a one-way ball valve co-acting with a seating (not shown) generally as described in connection with the first embodiment but, in this example, the ball valve can be selectively displaced from its seat by a spring loaded plunger rod 120 projecting axially from the associated valve module 116 to bear on the can track 114.

Each valve module 116 includes inlet and outlet apertures connecting with the chamber in which the ball valve is received and aligning with inlet and outlet bores 122, 124 respective to each valve module defined in the carrier plate 110.

Inlet bores 122 are interconnected by a common supply ring 126 of pipework and unions which is operatively continuously fed with pressurised water from a main supply in or on cutter head 106.

Each outlet bore 124 is connected by a delivery pipe 128 feeding one or more delivery jets (not shown) acting in a respective angular zone about head 100.

This particular machine cuts only during generally horizontal forward or rearward movement so that cutting takes place at one or other opposite sides of cutter head 106. The can track 114 is profiled to co-act with the plunger rods 120 to open the associated valves when their associated delivery jet or jets are passing through the angular zone on the respective side of the head assembly in which the cutting action is taking place, the valve associated with jets in the remaining angular zone being closed. Preferably the cam profile is such that as one valve closes a successive valve is open so that the overall water delivery remains at a constant rate.

When the direction of cutting is to be reversed so that the cutting zone is changed over to the opposite side of the head assembly 100, camming ring 112 is indexex through 180° so that the valve plunger rods 120 are operated when they reach the opposite side of the head. This indexing is conveniently effected semi-automatically, ring 112 is secured to a rotatable disc 130 rotatable on body 105 and which also serves as a closure for the axially inner end of the cutter barrel 109. This type of cutter head assembly is provided with an angularly movable hood or cowl (not shown) which encloses the non-acting zone of barrel 109 during cutting and which is swung over from one side of the other when the direction of cutting is to be reversed. A pair of pegs 132 attached to structure of the hood are engaged in apertures in plate 130 so that it and the associated camming ring 112 are indexed to the appropriate operating position when the hood is swung over.

This form of the invention can be fitted as an adaptation to existing machines without major dismantling or alteration of their mechanical parts and as its construction is compact it is accommodated within the barrel 109 where it is well protected and thus does not involve any alteration of the overall dimensions of the machine. These are particularly important considerations in the case of mining machinery.

I claim:

1. An operating head assembly comprising a non-rotatable body, a power driven, rotary head journaled in said body and thereby having an axis of rotation, and a fluid distribution system, a fluid input duct means incorporated in said fluid distribution system and connecting said body with said for head for continuous feed of fluid thereto as said head, in use, rotates relatively to said body, a plurality of delivery jet nozzles located at respective positions on said head, manifold means including at least one duct in said head for passing said fluid to said jet nozzles, a plurality of valve units carried in said head, a shut-off valve incorporated in each of said valve units, each said shut-off valve being biassed, in use, to a closed position, an hydraulic power operated actuating means, to open or close said duct(s) leading to said jet(s) in a respective angular sector of said actuating means being constituted by a plunger type actuator operable to displace said shut-off valve from said closed position, a plurality of hydraulic power ducts located equiangularly around said head on a common pitch circule, an annular radial face provided on said head, said hydraulic power ducts at one end thereof emerging at said annular radial face, an annular radial face of said body located in close proximity to said annular radial face of said head, a plurality of seal formations located in said annular radial face of said body about the same pitch circle, an annular radial face provided on said head, said hydraulic power ducts at one end thereof emerging at said annular radial face of said body located in close proximity to said annular radial face of said head, a plurality of seal formations located in said annular radial face of said body about the same pitch as said hydraulic power ducts so as to be co-operable therewith for the transmission of hydraulic power between said body and said head, and automatic timing means including drive input means of said body of said assembly operable for selective transmission of hydraulic power to said plunger type actuators of said valve units individually by way of said hydraulic power ducts co-acting with said seal formations as said head rotates, said timing means being controllable so that said fluid is supplied to said jet nozzles as they pass sequentially through a pre-selectable angular sector determined by the direction in which said head assembly is being displaced.

2. An assembly as in claim 1 wherein each said valve unit includes a shut-off valve biased to a closed position in use and wherein said shut-off valve is biased by the pressure of the fluid from the input duct means in use.

3. An assembly as in claim 1 wherein change-over valves effect said automatic control of said timing means, said change-over valves being arranged to feed the hydraulic power to those of the valve actuating means in said sector of said head determined by the direction of movement of said head, said change-over valve being linked to controls for setting said direction of movement to act automatically in response thereto.

4. An assembly as claimed in claim 1, wherein each of said shut-off valves is additionally biased by a spring.

5. An assembly as claimed in claim 1, wherein each of said shut-off valves is a ball valve.

6. An assembly as claimed in claim 1, wherein valve chambers are formed axially in said head and each of said valve chambers houses one of said valve units.

7. An assembly as claimed in claim 1, wherein said valve units are each formed as a module readily insertable and removable from said head.

8. An assembly as claimed in claim 1, wherein valve chambers are formed radially in said head and each of said valve chambers houses one of said valve units.

9. An assembly as claimed in claim 1, wherein said valve units are each formed as a module readily insertable and removable from said head.

10. The operating head assembly as claimed in claim 1 installed on a roadheader type mining machine.

11. The operating head assembly as claimed in claim 1 installed on a coal shearer type mining machine.

12. The operating head assembly as claimed in claim 1 installed on a machine tool.

13. An operating head assembly comprising a non-rotatable body, a power driven, rotary head journalled in said body and thereby having an axle of rotation, and a fluid distribution system, a fluid input duct means incorporated in said fluid distribution system and connecting said body with said head for continuous feed of fluid thereto as said head, in use, rotates relatively to said body, a plurality of delivery jet nozzles located at respective positions on said head, manifold means including at least one duct in said head for passing said fluid to said jet nozzles, a plurality of valve units carried in said head, each said valve unit having an hydraulic power operated actuating means, to open or close said duct(s) leading to said jet(s) in a respective angular sector of said head, a plurality of hydraulic power ducts located equiangularly around said head on a common pitch circle, an annular radial face provided on said head, said hydraulic power ducts at one end thereof emerging at said annular radial face, an annular face of said body located in close proximity to said annular radial face of said head, a plurality of seal formations located in said annular radial face of said body about the same pitch circle as said hydraulic power ducts so as to be co-operable therewith for the transmission of hydraulic power between said body and said head, and automatic timing means including drive input means of said body of said assembly operable for selective transmission of hydraulic power to said actuating means of said valve units individually by way of said hydraulic power ducts co-acting with said seal formations as said head rotates, said timing means being controllable so that said fluid is supplied to said jet nozzles as they pass sequentially through a pre-selected angular sector determined by the direction in which said head assembly is being displaced, with said valve units held closed by hydraulic pressure from said power ducts and allowed to open for delivery of said fluid to said sector of said head when hydraulic power from said units is allowable to exhaust.

14. An assembly as in claim 13 wherein each said valve unit includes a shut-off valve biased to a closed position in use and wherein said shut-off valve is biased by the pressure of the fluid from the input duct means in use.

15. An assembly as in claim 13 wherein change-over valves effect said automatic control of said timing means, said change-over valves being arranged to feed the hydraulic power to those of the valve actuating means in said sector of said head determined by the direction of movement of said head, said change-over valve being linked to controls for setting said direction of movement to act automatically in response thereto.

16. An assembly as claimed in claim 13 wherein each of said shut-off valves is additionally biased by a spring.

17. An assembly as claimed in claim 13 wherein each of said shut-off valves is a ball valve.

18. An assembly as claimed in claim 13 wherein valve chambers are formed axially in said head and each of said valve chambers houses one of said valve units.

19. An assembly as claimed in claim 13 wherein said valve units are each formed as a module readily insertable and removable from said head.

20. An assembly as claimed in claim 13 wherein valve chambers are formed radially in said head and each of said valve chambers houses one of said valve units.

21. An assembly as claimed in claim 20 wherein said valve units are each formed as a module readily insertable and removable from said head.

22. The operating head assembly as claimed in claim 13 installed on a roadheader type mining machine.

* * * * *